United States Patent [19]

Ellison et al.

[11] Patent Number: 4,548,448
[45] Date of Patent: Oct. 22, 1985

[54] BRIDGING CONNECTOR ASSEMBLY AND METHOD OF USING SAME

[75] Inventors: Edward Ellison, Oakland, N.J.; Otto R. Gruber, Wappingers Falls, N.Y.

[73] Assignee: New York Telephone Company, New York, N.Y.

[21] Appl. No.: 597,093

[22] Filed: Apr. 5, 1984

[51] Int. Cl.[4] ............................................ H01R 31/02
[52] U.S. Cl. ............................ 339/17 C; 339/166 R
[58] Field of Search ............... 339/17 R, 17 C, 17 M, 339/18 R, 18 B, 18 C, 18 P, 150 T, 198 R, 163, 166 R, 166 T

[56] References Cited

U.S. PATENT DOCUMENTS

| | | | |
|---|---|---|---|
| 3,270,251 | 8/1966 | Evans | 339/17 LM |
| 3,551,874 | 12/1970 | Volinskie | 339/17 R |
| 3,573,373 | 4/1971 | Mullin et al. | 179/98 |
| 3,611,268 | 10/1971 | Webb | 339/151 M |
| 3,641,475 | 2/1972 | Irish et al. | 339/17 L |
| 3,671,918 | 6/1972 | Mitchell | 339/18 R |
| 3,781,758 | 12/1973 | Anderson | 339/29 |
| 3,832,498 | 8/1974 | Lawson | 179/98 |
| 3,970,802 | 7/1976 | Nijman | 179/98 |
| 4,012,096 | 3/1977 | DeLuca et al. | 339/18 R |
| 4,037,910 | 7/1977 | Paluch | 339/198 R |
| 4,039,902 | 8/1977 | Lacan et al. | 361/395 |
| 4,122,313 | 10/1978 | DeLuca | 179/98 |
| 4,131,934 | 12/1978 | Becker et al. | 361/428 |
| 4,146,755 | 3/1979 | Causse | 179/98 |
| 4,271,455 | 6/1981 | McComas | 361/331 |
| 4,331,839 | 5/1982 | Baumbach | 179/98 |
| 4,335,364 | 6/1982 | Schmitz | 333/33 |

Primary Examiner—Neil Abrams
Attorney, Agent, or Firm—John J. Jordan; Thomas V. Heyman; Claire Ann Koegler

[57] ABSTRACT

A bridging connector for use in a telephone central office wherein the connector body has first and second rows of sockets on a first face and first and second rows of wire wrap terminals on a second face, the terminals being electrically connected to the sockets, and wherein a PC card is mounted on the body so that the wire wrap pins pass through first and second rows of apertures, these apertures being electrically connected to corresponding rows of holes through which extend first and second rows of connecting pins.

4 Claims, 3 Drawing Figures

BRIDGING CONNECTOR ASSEMBLY AND METHOD OF USING SAME

BACKGROUND OF THE INVENTION

This invention relates to bridging connectors and, in particular, to bridging connectors for use in facilitating the connection of subscriber lines from one main distributing frame to another in a telephone central office.

As is well known, in a telephone central office, wire conductors comprising subscriber lines are brought into the office and connected in groups to the back of a grid structure. The front of the grid structure is provided with pins each of which is electrically connected to a different one of the wire conductors of the subscriber lines. These pins provide electrical access to the subscriber lines and the switching equipment in the central office is thus connected to the lines through the pins.

In particular, the grid pins are usually arranged in adjacent rows of 16 pins with adjacent pins in the rows being connected to the tip and ring conductors of a given subscriber line. A plug connector then connects this grid pin group to a corresponding group of pins adapted to receive wire wrapping, i.e., to so called wire wrap pins. More specifically, the plug connector has on one face adjacent rows of female sockets and on another face adjacent rows of wire wrap pins which are electrically connected to the sockets. Connecting the female sockets of the plug connector to the grid pins thus electrically connects the adjacent rows of wire wrap pins to the grid pins and, therefore, to the subscriber lines.

Final connection of the subscriber lines to the central office main frame is through the wire wrap pins. Individual wire lines are wrapped around each pin. These lines are then formed into a cable and the cable brought to the main frame. The lines are then appropriately connected to the frame.

In a typical central office there are a large number of the aforementioned plug connectors providing connection of subscriber lines to the main frame. As a result, if the subscriber lines have to be connected from the existing main frame to a new main frame because of an upgrading of the telephone plant, the procedure for disconnecting the lines from the old frame and reconnecting the lines to the new frame becomes tedious and time consuming. It also results in down time for the subscribers.

In the presently existing procedure, a second set of wires is wired to the wire wrap terminals of each plug connector above the original wiring. This second set of wires is formed into a further cable which is to be connected to the new main frame. After the terminals are wrapped with the second set of wires, testing of the new wires and wire wrapped connections is carried out. Once all testing proves positive, the subscriber lines are placed out of service, while the new main frame is brought into service. Thereafter, the subscriber lines are again placed in service and finally the old wiring to the old frame is removed from the wire wrap terminals.

As above-indicated, the above procedures are quite tedious and, therefore, time consuming, and furthermore result in down time for the subscriber. In particular, when wiring the second set of wires above the original set, the craftsman must be extremely careful so as to not disturb the original wiring which still is being used to give the subscriber service. Furthermore, a similar tedious operation is encountered when removing the original wiring. Also, testing of the second set of wires is difficult, since the dual wiring on the wire wrapped pin leaves little room for conventional testing probes. The subscriber additionally experiences downtime when the new main frame is brought into service.

It is therefore a primary object of the present invention to provide a connector which facilitates changeover of subscriber lines from one main distributing frame to another in a telephone central office.

It is a further object of the present invention to provide a connector which permits changeover of subscriber lines from an old to a new main frame on a plug-out, plug-in basis.

SUMMARY OF THE INVENTION

In accordance with the principles of the present invention, the above and other objectives are realized in a connector assembly comprising a connector body and a printed circuit (PC) card or board. The connector body has first and second rows of female sockets on a first face and first and second rows of wire pins in electrical connection with the first and second rows of female sockets, on a second face. The PC card is mounted on the connector body so that the wire wrap pins pass through first and second rows of apertures in the PC card. These apertures, in turn, are electrically connected via the card printed circuit to corresponding adjacent first and second rows of holes. First and second rows of connecting pins extend through these holes and are mounted to the PC card. In this way, each female socket is electrically connected to a corresponding connecting pin, via a corresponding wire wrap pin, and a corresponding aperture, printed circuit and hole combination in the PC card.

With this type of construction for the connector assembly, the connection of subscriber lines from an old frame to a new frame in a central office is facilitated as follows. The conductors of the cable servicing the new frame are first wired to the empty wire wrap terminals of the connector body. These conductors and connections are then tested independently of the old frame and its cable and independently of the wire wrapped pins of the connectors coupled to the grid structure in the telephone office. Once the connector assembly tests positive, the connector connected to the grid can be unplugged from the grid and then plugged into the connecting pins on the connector assembly. The connector assembly can then be plugged into the grid. In this way, the subscriber lines will still be connected to the old frame via the old connector and the bridge provided by the connector assembly and to the new main frame via the latter assembly. However, the tedious process of wire wrapping already wire wrapped terminals is eliminated, as is the tedious process of testing these dual wrapped terminals. Also, the down time of the subscriber is reduced to a simple plug-out plug-in operation. Finally, removal of the connection to the old main frame is reduced simply to a plug-out situation by unplugging the old connector from the connector assembly.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
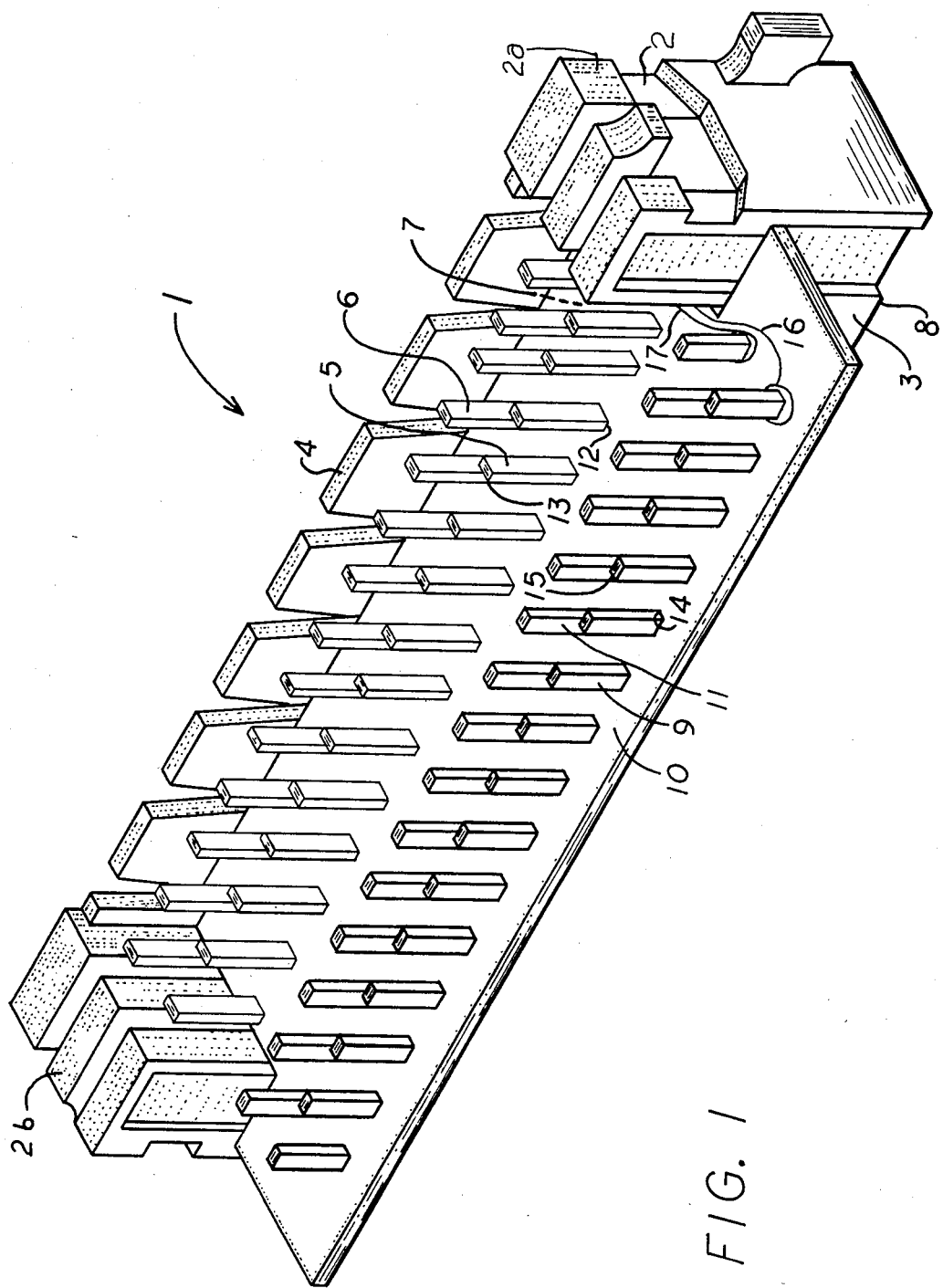
FIG. 1 shows a connector assembly in accordance with the principles of the present invention.

FIG. 1 shows a conductor assembly in accordance with the principles of the present invention. The assembly 1 comprises a molded body 2 having end sections 2A and 2B, a front wall 3 and slotted back wall 4. The body supports first and second rows of so called wire wrap terminals 5 and 6 which are flattened so as to better receive wrapped wire. These terminals are supported from a top surface 7 of the body 2.

Figure 2:
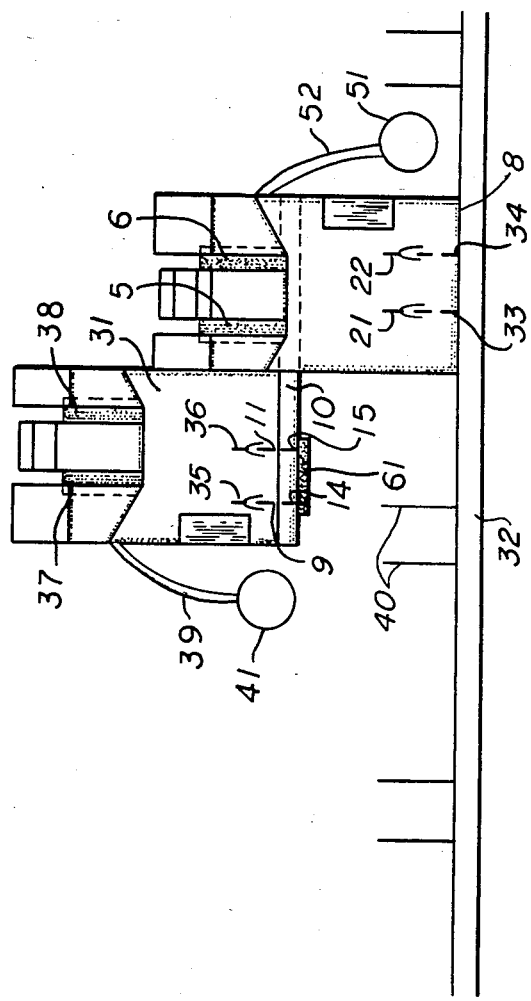
FIG. 2 shows the connector assembly of the invention connected to a grid structure in a telephone central office.

The bottom surface 8 of the body 2 is also provided with first and second rows of female sockets 21 and 22 (see, FIG. 2) which lie under the rows of the terminals 5 and 6, respectively, and are electrically connected thereto. To this point, the connector assembly is entirely standard in nature and connectors of this type are manufactured as part No. 963K1, by AT&T.

In accordance with the invention, the conductor assembly 1 is further adapted so that the assembly facilitates the connection and disconnection of the subscriber lines connected to a grid in a telephone central office. In particular, a PC card 10 is mounted on the body 2 above the top surface 7 and is adapted such that it provides first and second rows of pin connectors 9 and 11 which are electrically connected to the rows of flat terminals 5 and 6.

More specifically, the PC card 10 has first and second apertures 12 and 13 are engaged by and through which the terminals 5 and 6 pass when the PC card is mounted on the body 2. Adjacent to these rows of apertures are first and second rows of holes 14 and 15 which engage and hold the pins 9 and 11, respectively. A printed circuit 16 on the card connects each one of the apertuers 12 to a different one of the apertures 14. Similarly, a printed circuit 17 connects each aperture 13 to a different one of the apertures 15.

In view of the aforesaid connections, the female sockets 21 and 22 in the body 2 are now connected to corresponding wire wrapped terminals 5 and 6 as well as to corresponding pin connectors 9 and 11. The latter connections of these sockets to the pin connectors, are made through the apertures 12 and 13, the holes 14 and 15 and the printed circuit 16 and 17. The PC card thus serves to bridge the connection of the sockets to the pins in rows 9 and 11.

Figure 3:
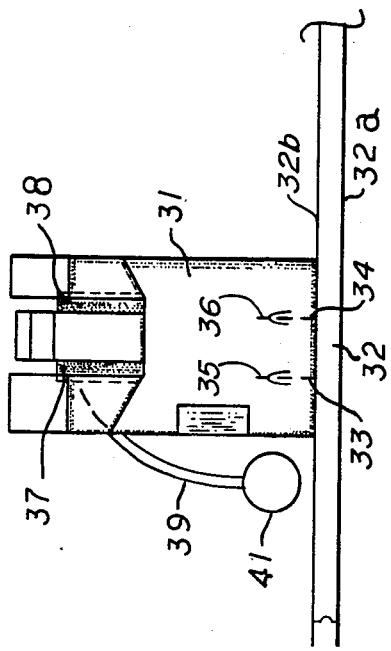
FIG. 3 shows a prior art connector connected to the grid structure of a telephone central office.

FIG. 3 shows a standard connector 31 connected to the grid structure 32 in a telephone central office. The grid structure on its side 32a connects to subscriber lines in pairs of rows and each pair of rows is brought to the other side 32b of the grid via rows of connecting pins 33 and 34. The connector 31, in turn, has rows of female sockets 35 and 36 which connect to these rows and which also connect to two corresponding rows of wire wrap terminals 37 and 38 like the terminals 5 and 6 of connector assembly 1. Wires 39 are wound on each connector and brought together to form a cable 41 which is then connected to the central office main frame.

As above-mentioned, if the subscriber lines associated with connector 31 are now to be connected to a new main frame, the above-described tedious process of wiring above the existing wire on the wire wrapped terminals of the connector, testing this wiring, bringing the new frame into service, and then removing the old wire would normally be performed. However, with the connector 1 of FIG. 1, this process is greatly facilitated.

Thus, if the subscriber lines of the connector 31 are to be connected to a new main frame, the connector assembly 1 would first have its wire wrap terminals 5 and 6 wrapped with appropriate wires 52 from the cable 51 leading to the new frame. This wiring is over unwired terminals so the initial wiring procedure is easier than having to dual wire a single terminal. The wire terminals are then tested. This testing is also much easier than in the dual wire case because of greater access to the wire wrap terminals and because the procedure is removed from the terminals providing connection of the subscriber lines to the old frame.

Once testing has been completed, connection to the new frame is carried out (See FIG. 2) be removing the old connector 31 and plugging it into the pins 9 and 11 of the connector assembly 1. The connector assembly 1 is then plugged into the pins 33 and 34. In this way, the subscriber lines are still connected to the old frame via the connector 31 and the bridge provided by connector assembly 1 and are connected to the new frame via the latter assembly.

After the new frame is brought into service, the old connector 31 can now be readily removed merely by unplugging it from the terminals 9 and 11. As can be appreciated, therefore, connector assembly 1 has made the switchover of the subscriber lines from the old frame to the new frame an easy matter and has reduced the tedious rewiring and unwiring procedure previously followed.

In a further aspect of the invention, the assembly 1 is further provided with a thin strip of electrically insulating material 61 on the underside of the PC card below the ends of the pins 9 and 11. This strip of material insulates the pins from other terminals 40 which are usually situated adjacent the pins 33 and 34 on the frame 32a and which carry power and other signaling information in respect of the subscriber lines.

What is claimed is:

1. A bridging connector assembly for use in changing the connection of multiple subscriber lines to a second main distributing frame from a first main distributing frame to which the multiple subscriber lines are connected by a plug connector, said bridging connector assembly being adapted to electrically connect with the plug connector, said bridging connector assembly comprising:

a connector body having first and second faces, said connector body including:
  first and second rows of female sockets opening out of said first face, said female sockets being adapted for receiving and electrically connecting with connecting pins from the multiple subscriber lines; and
  first and second rows of wire wrap terminals extending from said second face, each of said wire wrap terminals being electrically connected to a corresponding one of said female sockets, and said wire wrap terminals being adapted for receiving and electrically connecting with multiple wires from the second main distributing frame;

a printed circuit card having first and second rows of apertures, first and second rows of holes, and printed circuit electrically connecting each aperture of said first and second rows of apertures to a corresponding one of said first and second rows of holes, said printed circuit card being mounted to said second face of said connector body such that each of said wire wrap terminals extends through a corresponding one of said apertures and electrically connects with a corresponding printed circuit; and first and second rows of connecting pins mounted to said printed circuit card such that each of said connecting pins extends through a corresponding one of said holes and electrically connects with a corresponding printed circuit, thereby electrically connecting each of said connecting pins to a corresponding one of said wire wrap terminals and to a corresponding one of said female sockets, said connecting pins being adapted for electrically connecting with female sockets of the plug connector from the first main distributing frame.

2. A bridging connector assembly in accordance with claim 1 further comprising:

a strip of insulation mounted on said printed circuit card, such that said insulation overlies the ends of said connector pins.

3. A method of use of a bridging connector assembly in accordance with claim 1 for changing the connection of multiple subscriber lines to a second main distributing frame from a first main distributing frame to which the multiple subscriber lines are connected by a plug connector, the method comprising:

wrapping the appropriate wires from the second main distributing frame to wire wrap terminals of the bridging connector assembly;

testing the wrapped wire wrap terminals of the bridging connector assembly;

unplugging the plug connector to the first main distributing frame from the multiple subscriber lines;

plugging the plug connector onto the bridging connector assembly to electrically connect female sockets of the plug connector to connecting pins of the bridging connector assembly; and plugging the bridging connector assembly onto the multiple subscriber lines.

4. A method in accordance with claim 3 further comprising:

unplugging the plug connector from the bridging connector assembly.

* * * * *